United States Patent [19]

Takada

[11] Patent Number: 4,989,897
[45] Date of Patent: Feb. 5, 1991

[54] APPARATUS FOR JOINING AN AIR BAG COVER TO A RETAINER

[76] Inventor: Juichiro Takada, No. 12-1 Shinmachi, 3-chome, Setagayaku, Tokyo 105, Japan

[21] Appl. No.: 335,277

[22] Filed: Apr. 10, 1989

[51] Int. Cl.⁵ .............................................. B60R 21/16
[52] U.S. Cl. .................................. 280/743; 403/286; 403/341; 280/732
[58] Field of Search ............... 280/743, 728, 731, 730, 280/732, 736, 737, 741; 403/341, 286

[56] References Cited

U.S. PATENT DOCUMENTS 4,810,005  3/1989  Föhl ..................................... 280/732

FOREIGN PATENT DOCUMENTS

| | | | |
|---|---|---|---|
| 3545028 | 7/1987 | Fed. Rep. of Germany | 280/743 |
| 2335373 | 7/1977 | France | 280/732 |
| 212147 | 9/1988 | Japan | 280/743 |
| 109146 | 4/1989 | Japan | 280/743 |

Primary Examiner—Charles A. Marmor
Assistant Examiner—Karin Tyson
Attorney, Agent, or Firm—Brumbaugh, Graves, Donohue & Raymond

[57] ABSTRACT

An air bag assembly comprises a retainer having a main wall on which an air bag and an inflator are mounted and a peripheral wall projecting from the main wall and a cover having a main wall and side walls forming a cavity in which the air bag is received in folded relation and flanges extending from the edges of the side walls and engaging in face-to-face relation the outer faces of the peripheral wall of the retainer. The cover flanges have outwardly projecting beads along their free edges. The flanges are clamped by plates engaging the outside surfaces of the flanges to the peripheral wall, and the edges of the plates are engaged by the beads, whereby the loads on the flanges resulting from loads on the cover when the air bag inflates and breaks the cover are transmitted by the beads to the plates.

1 Claim, 3 Drawing Sheets

APPARATUS FOR JOINING AN AIR BAG COVER TO A RETAINER

FIELD OF THE INVENTION

This invention relates to improvements in an air bag device which is mounted in front of an occupant of a car or other vehicle and can absorb an impact on the occupant by inflating in a collision of the vehicle. More particularly, this invention concerns an apparatus for enhancing the strength of the connection between an air bag cover and a retainer.

BACKGROUND OF THE INVENTION

In FIG. 7 there is shown a conventional type of air bag device (a partial sectional view) which comprises a breakable air bag cover 31, a retainer 32 for mounting the air bag device on a part of the vehicle, an inflator 33 for generating gas and an air bag 34 folded in a closed space A defined by the cover 31, the retainer 32 and the inflator 33.

In a vehicle collision, the inflator 33, in response to a signal from a collision detector (not illustrated), inflates the air bag 34 by jetting a large quantity of gas rapidly from a number of gas discharge holes 33a. The air bag 34, as it starts its rapid inflation, breaks the cover 31, and then continues to inflate into a thick disc form and absorbs an impact when the occupant is thrown forward against it.

Such a conventional air bag device is assembled and disposed on the vehicle body in accordance with the following procedures. First of all, the air bag 34, a ring 35 and the inflator 33 are all fastened to the retainer 32 by means of bolts 36. Then, the air bag 34 is folded to a size as small as possible in such a form as to be inflatable rapidly, and the cover 31 for the air bag 34 is fitted to the retainer 32. Fasteners 40, such as blind rivets, are inserted in openings from the outer side of the cover 31, with washers 39, and extend into the interior of the retainer 32. The rivets, upon deformation, clamp the cover firmly between the washers 31 and the retainer 32. The air bag device is fastened to a mounting member 38 by means of bolts 37. Numeral 41 designates a protecting cover or trim piece mounted on the vehicle body.

According to Examined Japanese Utility Model Publication No. 58-49887, it is also known to affix an air bag cover to a part of the vehicle body using bolts and nuts.

With the structure of FIG. 7, when the air bag 34 is inflated and breaks the cover, a very high force is applied to the air bag cover 31 in a direction that tends to dislodge it from the retainer 32. This high force acts against the rivets 40 (or bolts) which extend through the holes 42 in the cover 31 and produces remarkably high shearing loads on the cover in the proximities of the holes 42. Accordingly, it is necessary to use a large number of rivets (or bolts) in order to prevent the cover from being detached from the retainer when the bag inflates. The large number of rivets makes assembly of the cover to the retainer cumbersome, time-consuming and costly.

SUMMARY OF THE INVENTION

The present invention is an improved arrangement for joining the air bag cover to the retainer. As in the conventional assembly, the retainer has a main wall on which the air bag and an inflator are mounted and a peripheral wall projecting from the main wall, and the cover has a main wall and side walls forming a cavity in which the air bag is received in folded relation. Flanges extend from the edges of the side walls and engage in face-to-face relation the outer faces of the peripheral wall of the retainer. The present invention is characterized in that the cover flanges have projecting beads along their free edges, in that the flanges are clamped by plates engaging the outside surfaces of the flanges to the peripheral wall, and in that the edges of the plates are engaged by the beads, whereby the loads on the flanges resulting from loads on the cover when the air bag inflates and breaks the cover are transmitted by the beads to the plates.

In one embodiment the invention is further characterized in that the peripheral wall of the retainer is oblique to the main wall and diverges with respect to the main wall toward its free edge and in that the plates are portions of a band that is co-extensive with the peripheral wall of the retainer.

In another embodiment the invention is further characterized in that the peripheral wall of the retainer projects from the main wall in a direction away from the main wall of the cover, in that the cover flanges also have projecting beads that extend inwardly and engage the free edge of the peripheral wall of the retainer, and in that the flanges are clamped to the peripheral wall of the retainer by fasteners that pass through the plates, the flanges and the peripheral wall of the retainer.

In the fastening apparatus of the present invention, the load exerted on the cover by the inflating air bag is transmitted through the side walls of the cover to the flanges. Instead of being resisted by engagement of fasteners in the holes that receive them and being sustained by concentrated shear forces in the cover flanges, the loads are distributed relatively evenly along the lengthwise extents of beads and are transmitted to the plates. Accordingly, the concentrated stress areas in the cover flanges are eliminated. If rivets or bolts are used, fewer are needed, and the difficulty, time and costs of assembly are reduced.

For a better understanding of the invention, reference may be made to the following description of exemplary embodiments, taken in conjunction with the accompanying drawings.

DESCRIPTION OF THE EMBODIMENTS

Figure 1:
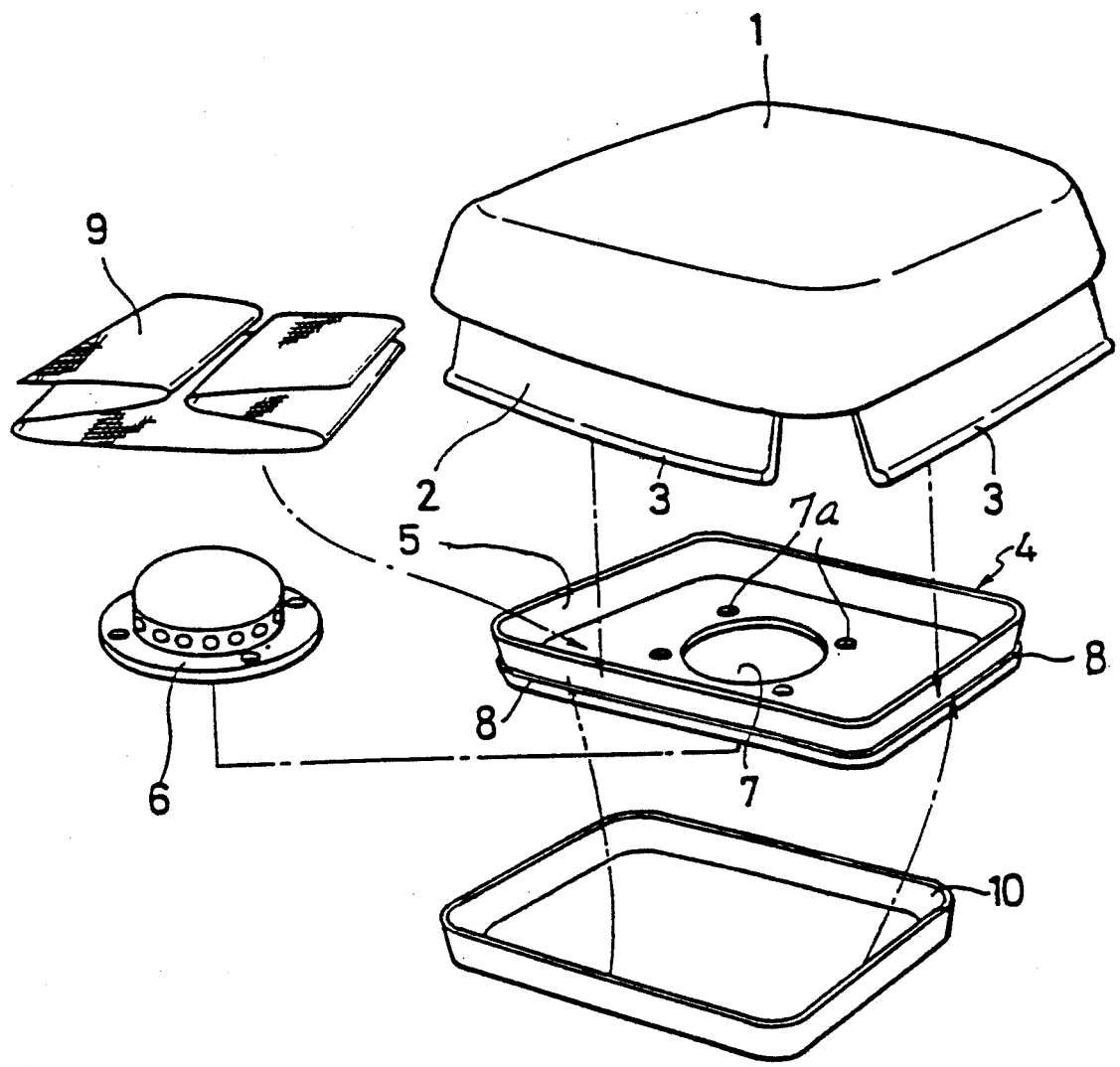
FIG. 1 is an exploded pictorial view of an air bag cover and a retainer joined by apparatus according to this invention.
Figure 2:
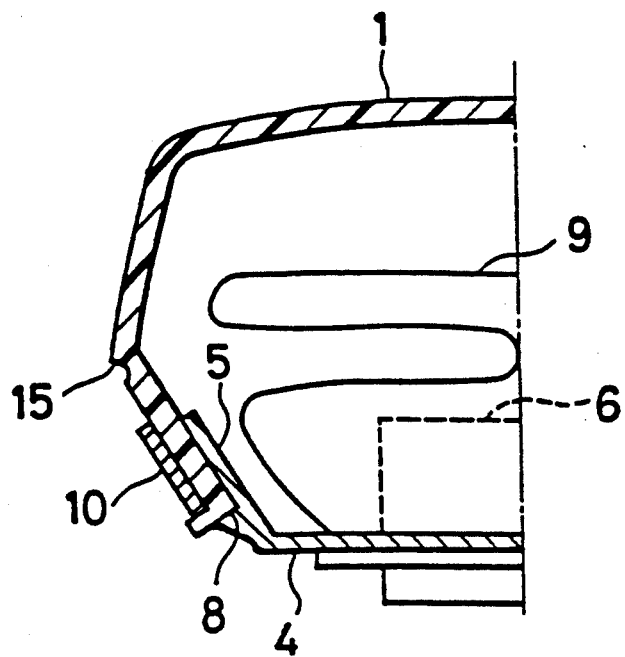
FIG. 2 is a partial longitudinal sectional view of the embodiment of FIG. 1 in assembled condition.
Figure 3:
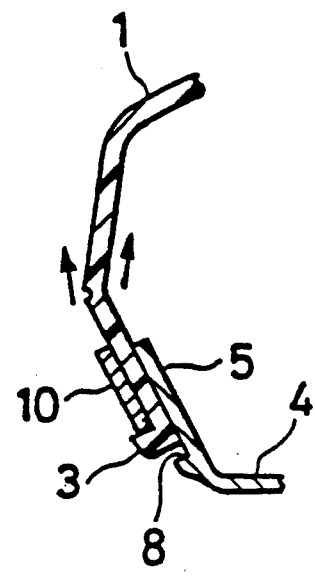
FIG. 3 is a sectional view of the embodiment of FIG. 1 at the time of breaking of the cover.

In the embodiment of FIGS. 1 to 5, an air bag cover 1 of nearly square-shape has a main wall and four side walls, each of which has a respective flange 2. Each flange 2 has a convex, outward protrusion or bead 3 along its edge. A retainer 4 has a main wall and a peripheral wall 5 projecting from its perimeter. According to this embodiment, the peripheral wall 5 of the retainer 4 is oblique to the main wall and diverges with respect to the main wall toward its free edge. The peripheral wall 5 is, at its bottom, provided with a shoulder 8 which the ends of the flanges 2 of the cover engage (FIG. 2). The retainer 4 is, on its central part, provided with a hole 7 that receives an inflator 6 for generating gas. A plurality of holes 7a are located around the opening 7 for the bolts that fix the inflator 6 and the air bag 9 to the retainer. The air bag 9 is folded within the compartment formed by the retainer 4 and the air bag cover 1. A ring-shaped band 10 is formed such that its walls diverge relative to the plane of the smaller opening toward the plane of the larger opening. The angle of divergence of the band 10 matches that of the peripheral wall 5 of the retainer, as may be seen in FIG. 2. The cover 1 is fitted to the retainer 4 such that the flanges 2 engage the outer surfaces of the peripheral wall 5. The band 10 is fitted over the cover flanges with its lower edge engaging the beads 3 of the cover flanges and clamps the cover flanges 2 to the retainer 4. The beads 3 are sufficiently compressible, and are suitably dimensioned and shaped, to enable the band 10 to be pressed into place over the flanges 5 from the underside of the retainer. In this respect, the sizes of the beads 3 and shoulders 8, as shown in FIGS. 2 and 3, are somewhat exaggerated for clarity.

When the air bag inflates and applies a shock load to the cover, that load is transmitted through the side walls of the cover to the flanges 2. The arrows in FIG. 3 show the direction of the load exerted on the flanges. The load is distributed along the lengths of the flanges 2 and to the beads 3, which in turn transmit the load to the lower edge of the band 10. While some displacement of the cover 1 and band 10 can occur (FIG. 3) under the strains in the band and the flanges and deformation of the peripheral wall 5, the cover is firmly retained on the retainer due to the divergence of the peripheral wall 5 of the retainer 4. Because the load tending to detach the cover is distributed along the lengths of the side or plate portions of the band, where the beads 3 engage the band, the shear stresses at the junctures of the beads with the walls of the flanges are kept small. By making the band of a strong material, such as steel, it can well endure the tensile stresses exerted by the wedging action of the divergent displacement under load (FIG. 3).

Figure 4:
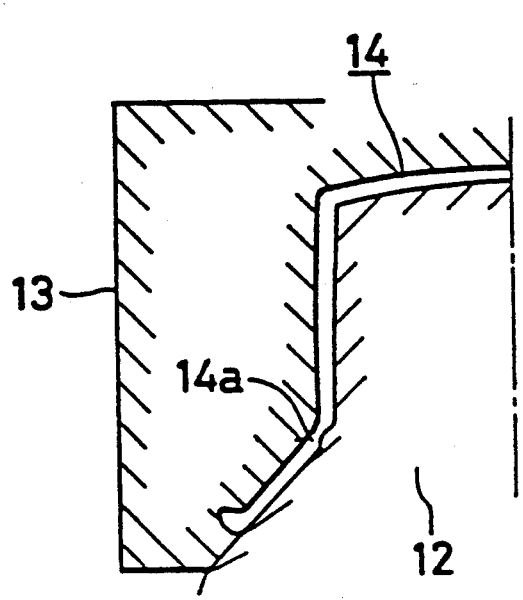
FIGS. 4 and 5 are sectional views of a forming process for making the air bag cover.
Figure 5:
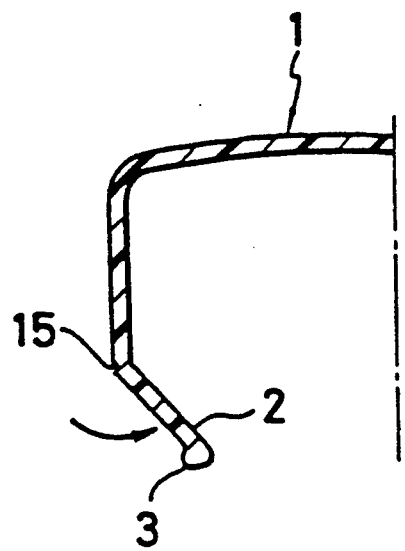

The air bag cover 1 may be molded by using, e.g., a suitable synthetic resin or the like. It is preferable to make use of molds, such as those shown in FIG. 4, comprising two parts 12 and 13 forming a cavity 14. A part 14a of the cavity which forms the flange 2 is inclined outwardly in the cavity 14. Since it has no undercut sections, the molding process is easy. The air bag cover 1 molded by the molding device shown in FIG. 4 is fitted to the retainer 4 by bending the flanges inwardly, as shown in FIG. 5. To make it easy to bend the flanges 2, a concave portion 15 is formed at the juncture of each flange 2 with the side walls.

Figure 6:
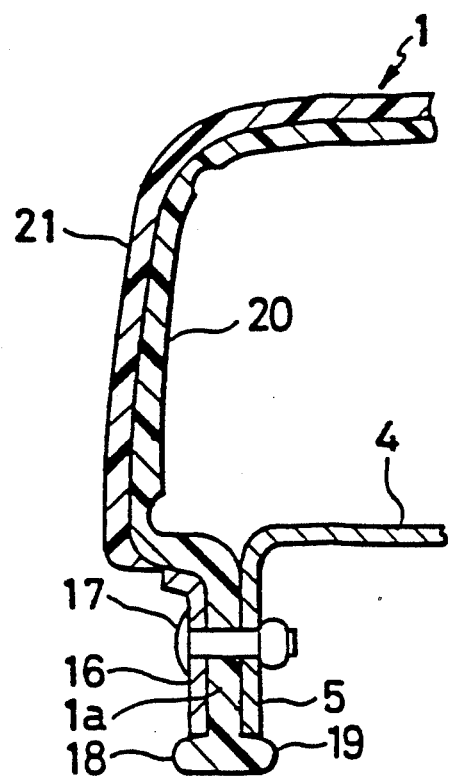
FIG. 6 is a partial cross-sectional view of another embodiment of the invention.
Figure 7:
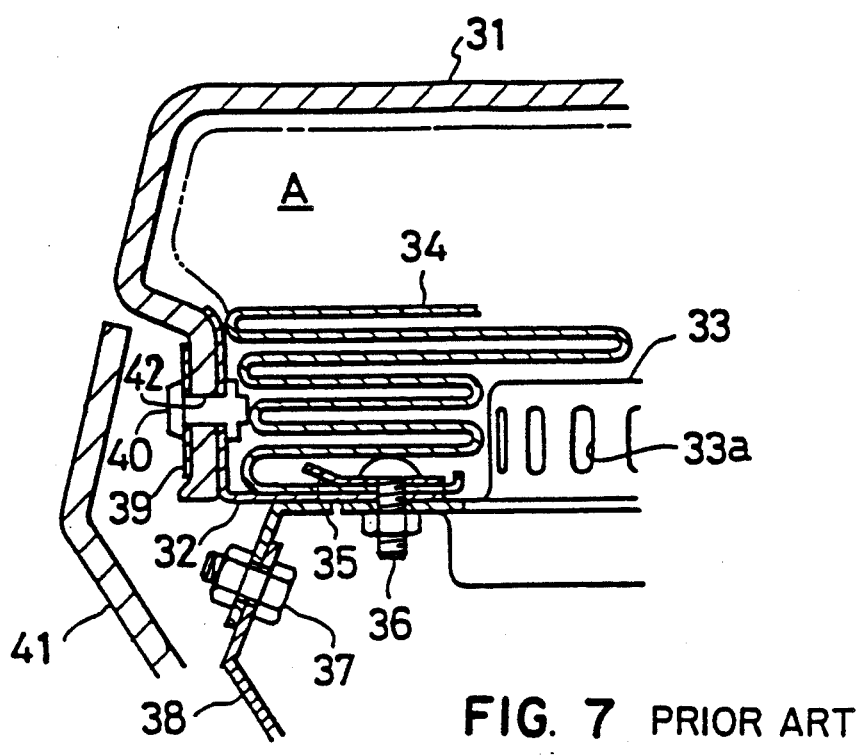
FIG. 7, as described above, is a partial cross-sectional view of a prior art air bag device.

In the embodiment of FIG. 6, the peripheral wall 5 of the retainer 4 forms a nearly right angle relative to the main wall and projects in a direction away from the compartment for the air bag. The flanges 1a of the air bag cover 1 are fitted to the outer surface of the peripheral wall 5. Further, a plate 16 (a steel plate in this embodiment) is mounted on the outer surface of each flange 1a. Blind rivets 17 pass through the steel plate 16, the flange 1a and the peripheral wall 5, whereby the flange 1a is firmly clamped by the steel plate 16 and the peripheral wall 5.

The flange 1a has at its lower edge an outward protrusion or bead 18 and an inward protrusion or bead 19 that are engaged, respectively, with the lower edge of the steel plate 16 and the lower edge of the peripheral wall 5.

When the air bag inflates, the air bag cover 1 is pushed in a direction tending to detach it from the retainer 4. The beads 18 and 19 are engaged with the edge of the steel plate 16 and the edge of the peripheral wall 5, respectively, so that the load on the cover 1 is distributed over the entire lengths of the flanges 1a along the beads 18 and 19 and transmitted to the lower edges of the plates 16 and the peripheral wall 5 of the retainer. Accordingly, there are no concentrated shearing loads on the flanges 1a near the rivets and retention of the cover with fewer rivets is ensured.

In this embodiment, the air bag cover 1 comprises a hard core layer 20 and a soft superficial layer 21, so that it is more comfortable to an occupant of the vehicle who bumps against it. Further, even if the cover 1 is partly shattered into small pieces when the air bag is inflated, any pieces of the core layer 20 are retained by the soft superficial layer 21, and scattering of such fragments is prevented.

The steel plate 16 of the embodiment of FIG. 6 may be a ring-shaped band like the ring-shaped band 10 of FIGS. 1 to 5, so that it surrounds the whole outer circumference of the cover 1. In such a modified arrangement, rivets (or nuts and bolts) hold the band in place, but the loads on the cover are distributed along the beads 18 and 19, and concentrated loads on the cover around the rivets are avoided.

I claim:

1. Apparatus for joining an air bag cover to a retainer, the retainer having a main wall on which the air bag and an inflator are mounted and a peripheral wall projecting from the main wall, and the cover having a main wall and side walls forming a cavity in which the air bag is received in folded relation and flanges extending from the edges of the side walls and engaging in face-to-face relation the outer faces of the peripheral wall of the retainer, characterized in that the cover flanges have outwardly projecting beads along their free edges, in that the flanges are clamped by plates engaging the outside surfaces of the flanges to the peripheral wall, the plates extending substantially continuously along the peripheral wall of the retainer, in that the edges of the plates are engaged by the beads entirely along the lengths of the beads, whereby the loads on the flanges resulting from loads on the cover when the air bag inflates and breaks the cover are transmitted by the beads to the plates, in that the peripheral wall of the retainer projects from the main wall in a direction away from the main wall of the cover, in that the cover flanges also have beads that project inwardly and engage the free edge of the peripheral wall of the retainer, and in that the flanges are clamped to the peripheral wall of the retainer by fasteners that pass through the plates, the flanges and the peripheral wall of the retainer.

* * * * *